(12) United States Patent
Georgiadis

(10) Patent No.: US 12,216,726 B2
(45) Date of Patent: Feb. 4, 2025

(54) PROVISION OF DIFFERENT CONTENT PAGES BASED ON VARYING USER INTERACTIONS WITH A SINGLE CONTENT ITEM

(71) Applicant: Google LLC, Mountain View, CA (US)

(72) Inventor: Margaret Calliope Georgiadis, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/975,759

(22) PCT Filed: Feb. 6, 2020

(86) PCT No.: PCT/US2020/016922
§ 371 (c)(1),
(2) Date: Aug. 26, 2020

(87) PCT Pub. No.: WO2021/112900
PCT Pub. Date: Jun. 10, 2021

(65) Prior Publication Data
US 2022/0292144 A1  Sep. 15, 2022

(30) Foreign Application Priority Data

Dec. 6, 2019   (GR) .............................. 20190100548

(51) Int. Cl.
*G06F 17/00* (2019.01)
*G06F 3/0483* (2013.01)
(Continued)

(52) U.S. Cl.
CPC .......... *G06F 16/954* (2019.01); *G06F 3/0483* (2013.01); *G06F 3/04842* (2013.01); *G06F 16/958* (2019.01)

(58) Field of Classification Search
CPC .... G06F 16/954; G06F 16/958; G06F 3/0483; G06F 3/04842
(Continued)

(56) References Cited

U.S. PATENT DOCUMENTS 6,366,906 B1 * 4/2002 Hoffman ............... G06F 16/332
8,122,014 B2 * 2/2012 Brindley ............. G06F 16/9566
705/14.4

(Continued)

FOREIGN PATENT DOCUMENTS

CN       104428810      3/2015
JP       2009-517774    4/2009
(Continued)

OTHER PUBLICATIONS

International Preliminary Report on Patentability in International Appln. No. PCT/US2020/016922, mailed on Jun. 16, 2022, 9 pages.
(Continued)

*Primary Examiner* — Matthew Ell
*Assistant Examiner* — Matthew J Ludwig
(74) *Attorney, Agent, or Firm* — Fish & Richardson P.C.

(57) ABSTRACT

Methods, systems, and computer programs encoded on a computer storage medium, that provide different content pages based on varying user interactions with a content item on a content page. A first content page that includes a first multi-interaction content navigation item may be provided for display within a first application. A first set of user interactions with this content navigation item may cause display of a second content page that is linked to by this content navigation item. A second set of user interactions with this content navigation item may cause display of a different content page that is generated using contextual data. When data indicating performance of the second set of user interactions with this content navigation item may be
(Continued)

received, the contextual data may be obtained, based on which, the third content page may be provided for display within the first application.

20 Claims, 4 Drawing Sheets

(51) Int. Cl.
G06F 3/04842 (2022.01)
G06F 16/954 (2019.01)
G06F 16/958 (2019.01)

(58) Field of Classification Search
USPC ........................................................ 715/764
See application file for complete search history.

(56) References Cited

U.S. PATENT DOCUMENTS

| | | | |
|---|---|---|---|
| 8,407,094 B1 | 3/2013 | Axe et al. | |
| 9,146,665 B2* | 9/2015 | Gandhi | G06F 3/04842 |
| 9,276,855 B1 | 3/2016 | Mengle et al. | |
| 9,317,857 B1* | 4/2016 | Terleski | G06Q 30/02 |
| 9,779,065 B1 | 10/2017 | Lee | |
| 10,050,849 B1* | 8/2018 | Long | H04L 43/04 |
| 10,699,678 B2* | 6/2020 | Page | G09G 5/377 |
| 2006/0238795 A1* | 10/2006 | Van Hoof | G06F 40/166 |
| | | | 358/1.14 |
| 2007/0124307 A1 | 5/2007 | Van Der Linden | |
| 2007/0136690 A1* | 6/2007 | MacLaurin | G06F 3/0482 |
| | | | 715/822 |
| 2008/0306913 A1 | 12/2008 | Newman et al. | |
| 2009/0019039 A1 | 1/2009 | Brindley et al. | |
| 2009/0044142 A1* | 2/2009 | Faris | G06F 16/954 |
| | | | 715/780 |
| 2011/0173569 A1* | 7/2011 | Howes | G06F 16/9574 |
| | | | 707/707 |
| 2012/0030628 A1* | 2/2012 | Lee | G06F 3/04817 |
| | | | 715/835 |
| 2012/0136756 A1* | 5/2012 | Jitkoff | G06F 16/9577 |
| | | | 715/224 |
| 2013/0063442 A1 | 3/2013 | Zaman et al. | |
| 2013/0073387 A1* | 3/2013 | Heath | G06Q 30/02 |
| | | | 705/14.53 |
| 2014/0019868 A1 | 1/2014 | Varian | |
| 2014/0227668 A1* | 8/2014 | Khalsa | G09B 19/025 |
| | | | 434/188 |
| 2015/0254217 A1* | 9/2015 | Gorskiy | G06F 40/134 |
| | | | 715/205 |
| 2015/0278687 A1 | 10/2015 | Sculley et al. | |
| 2015/0371321 A1* | 12/2015 | Chapuis | G09F 3/208 |
| | | | 705/27.1 |
| 2016/0275906 A1* | 9/2016 | Scott | G06F 1/266 |
| 2017/0371877 A1 | 12/2017 | Badr et al. | |
| 2019/0150823 A1* | 5/2019 | Hinton | G16H 50/20 |
| 2019/0278687 A1 | 9/2019 | Kameo et al. | |
| 2019/0286745 A1 | 9/2019 | Jain et al. | |
| 2020/0150851 A1* | 5/2020 | Werner | G06F 3/04886 |
| 2020/0293160 A1* | 9/2020 | Soyarslan | G06F 16/958 |
| 2020/0364276 A1* | 11/2020 | Kunz | G06F 40/109 |
| 2022/0035521 A1* | 2/2022 | Smochko | G06F 3/038 |

FOREIGN PATENT DOCUMENTS

| | | |
|---|---|---|
| JP | 2011-181109 | 9/2011 |
| JP | 2013-517556 | 5/2013 |
| KR | 10-2015-0031331 | 3/2015 |
| KR | 10-2019-0022687 | 3/2019 |
| WO | WO 2016/011647 | 1/2016 |

OTHER PUBLICATIONS

Office Action in Indian Appln. No. 202027036415, dated Jul. 12, 2022, 7 pages.
Notice of Allowance in Japanese Appln. No. 2020-549809, dated Oct. 11, 2022, 5 pages (with English translation).
PCT International Search Report and Written Opinion in International Appln. No. PCT/US2020/016922, dated May 25, 2020, 15 pages.
Office Action in Korean Appln. No. 10-2020-7027053, dated Sep. 16, 2022, 5 pages (with English translation).
Office Action in Korean Appln. No. 10-2022-7043544, mailed on Aug. 9, 2023, 6 pages (with English translation).
Office Action in European Appln. No. 20710356.5, mailed on Oct. 18, 2023, 10 pages.
Office Action in Indian Appln. No. 202328020543, mailed on Oct. 30, 2023, 7 pages (with English translation).
Notice of Allowance in Japanese Appln. No. 2022-180537, mailed on Feb. 5, 2024, 5 pages (with English translation).
Notice of Allowance in Korean Appln. No. 10-2022-7043544, mailed on Feb. 13, 2024, 4 pages (with English translation).
Office Action in Chinese Appln. No. 202080001986.8, mailed on Jul. 27, 2024, 22 pages (with English translation).
Office Action in European Appln. No. 20710356.5, mailed on Apr. 26, 2024, 11 pages.

* cited by examiner

PROVISION OF DIFFERENT CONTENT PAGES BASED ON VARYING USER INTERACTIONS WITH A SINGLE CONTENT ITEM

CROSS-REFERENCE TO RELATED APPLICATIONS

This application is a National Stage Application under 35 U.S.C. § 371 and claims the benefit of International Application No. PCT/US2020/016922, filed Feb. 6, 2020, which claims priority to Greek application Ser. No. 20190100548, filed Dec. 6, 2019, the disclosures of which are incorporated herein by reference.

BACKGROUND

This specification relates to the provision of different content pages based on varying/different user interactions with a single content item on a content page.

A user can access content (e.g., news, music, social media) on a content page provided by a publisher (e.g., search engines, social media platforms, news platforms, data aggregator platforms, etc.). The content on the content page can include content items that can be provided by a publisher or by one or more content sources. The content items provided on such a content page can include, e.g., content navigation items and non-content navigation content items. As further described in this specification, a content navigation item is a content item that, upon being interacted with by a user device, causes display of a separate content page (i.e., a content page other than the content page that includes the content navigation item). On the other hand, a non-content navigation item is a content item, that upon being interacted with by a user device, does not result in display of a separate content page.

Conventionally, when a user of a user device interacts with a content navigation item on a content page within a first application (e.g., a native application), only one action typically occurs: a separate content page, which is linked to by the content navigation item, is provided for display generally within a separate application (e.g., a web browser). Thus, the content navigation item only links to a single content page, which can be a content page that is further descriptive, representative of, or otherwise related to the content provided for display within the content navigation item. For example, if an image of baby blankets is shown in the content navigation item, the separate page to which this content item is linked may be a webpage on a website for the baby blanket's manufacturer.

SUMMARY

In general, one innovative aspect of the subject matter described in this specification can be embodied in methods that may include the operations of providing, for display within a first application on a user device, a first content page that includes a first multi-interaction content navigation item, wherein: a first set of user interactions with the first multi-interaction content navigation item causes display of a second content page that (1) is different from the first content page and (2) is linked to by the first content navigation item; and a second set of user interactions with the first multi-interaction content navigation item causes display of a third content page within the first application, wherein the second set of user interactions is different from the first set of user interactions and the third content page (1) is different from the first and second content pages and (2) is generated using contextual data, the contextual data representing a context in which content is provided for display on the first content page within the first application; receiving, from the user device, data indicating a performance of the second set of user interactions with the first multi-interaction content navigation item; in response to receiving the data indicating the performance of the second set of user interactions: obtaining contextual data representing a context in which content is provided for display on the first content page within the first application; and providing, for display within the first application and using the contextual data, the third content page. Other embodiments of this aspect include corresponding systems, devices, apparatus, and computer programs configured to perform the actions of the methods. The computer programs (e.g., instructions) can be encoded on computer storage devices. These and other embodiments can each optionally include one or more of the following features.

In some implementations, the third content page includes a second multi-interaction content navigation item, wherein: a first set of user interactions with the second multi-interaction content navigation item causes display of a fourth content page that (1) is different from the third content page and (2) is linked to by the second multi-interaction content navigation item; and a second set of user interactions with the second multi-interaction content navigation item causes display of a fifth content page within the first application, wherein the fifth content page (1) is different from the third and fourth content pages and (2) is generated using contextual data representing a context in which content is provided for display on the third content page within the first application.

In some implementations, each of the second, third, fourth, and fifth content pages may be provided as an overlay page within the first application, wherein the overlay page is displayed over the first content page.

In some implementations, a request from the user device to close the overlay page may cause the overlay page to be closed and the first content page to be presented for display.

In some implementations, content items for each of the third content page and the fifth content page may be selected from plurality of content sources.

In some implementations, content items for each of the third content page and the fifth content page may be provided by a plurality of publishers.

In some implementations, each of the third content page and the fifth content page may include one or more additional content items, and the second multi-interaction content navigation item and the one or more additional content items may include a combination of image content, textual content, and video content.

In some implementations, the contextual data may include (1) content provided for display in the first multi-interaction content navigation item, (2) other content provided for display on the first content page, or (3) content provided on other pages that the user has visited and from which the first content page is linked.

In some implementations, the contextual data representing a context in which content is provided for display on the third content page within the first application may include (1) content provided for display in the second multi-interaction content navigation item, (2) other content provided for display on the third content page, or (3) content provided on other pages that the user has visited and from which the third content page is linked.

In some implementations, the contextual data may include content preferences associated with the user device.

Particular embodiments of the subject matter described in this specification can be implemented to realize one or more of the following advantages. The innovations described in this specification can save computing resources when providing one or more other content pages that are linked to by a multi-interaction content navigation item on a particular content page. For example, when a user interacts with a multi-interaction content navigation item, the techniques described in this specification cause the one or more linked content pages to be opened within the same application, which already has a set of computing resources (e.g., memory and processing resources) allotted to the application by the user device. This saves additional computing resources that would otherwise be needed for a separate application (e.g., in the form of obtaining an additional allotment of memory and processing resources for the separate application) to open the one or more linked content pages. This can enable the one or more linked content pages to be opened more quickly and can result in reduced lag relative to other arrangements. In addition, through expanding the functionality of the application such that additional applications need not be invoked and operated in parallel, the computational and energy efficiency of the stated operations can be increased.

As another example, compared to conventional techniques, the innovations described in this specification also save computing resources by automatically utilizing contextual data in identifying content for one or more of the linked content pages. Conventionally, a user issues a search query to a search engine (or another content platform) to identify particular types of content and then repeatedly refines this query (e.g., by issuing additional queries) to provide additional context until the content platform provides the content that the user is seeking. Each such repeated query consumes computing resources (e.g., resources of the content platform and/or the user device) in identifying content and generating the resulting content pages. In particular, each such repeated query may require additional computational resources to be directed to receiving input relating to the further query, to derivation of the results of the further query, and to rendering of the results of the further query on a display screen. Receipt and processing of these further queries at intervals may also cause interruption of other computational processes and/or leave fewer computational resources available for other computational processes performed by the content platform and/or the user device. In contrast, the techniques described in this specification automatically—and in the first instance—leverage the contextual data (representing a context in which content is provided for display on the first content page and/or on one or more other content pages, including content page(s) from which the first content page is linked) in identifying relevant content items and providing it for display on a separate content page. In leveraging the contextual data in identifying content, the techniques described in this specification avoid the multiple resources that would otherwise be consumed in repeatedly refining a query to inject context that ultimately results in identifying the appropriate content. This can increase the efficiency of identifying the appropriate content, for example through use of fewer processor cycles, and can lead to performance of the stated operations in a less energy intensive manner.

The innovations described in this specification can provide modified user interface elements (such as multi-interaction content navigation items) that improve the user interface provided by a publisher. This in turn can also help improve user engagement on a publisher's platform in comparison to conventional techniques. Conventionally, a user can only interact in a single way with a content navigation item to access a separate content page that is linked to by the content navigation item. Moreover, to link to additional content pages, conventional techniques include separate content navigation items/interface elements (i.e., each content navigation item or interface element is linked to and associated with a separate content page). In contrast, the techniques described in this specification modify content navigation items (and/or interface elements) into multi-interaction content navigation items that facilitate different types of user interactions with the content item, each of which can be associated with multiple content pages that provide different types of content. As a result, the multi-interaction content navigation item/interface element enables access to multiple different content pages.

Moreover, the innovations described in this specification can improve user engagement on a publisher's platform in comparison to conventional techniques. As described in this specification, one or more of the linked content pages include content that is dynamically generated based on the contextual data representing context within which the content on one or more content pages is provided for display. Unlike conventional linked content pages that only provide the same content page that is linked to by the content navigation item, the dynamically-generated content page described in this specification provides a more enhanced content landscape to the user by curating content from multiple content sources, publishers, and creators. This dynamically-generated content page also varies by context and thus, the same multi-interaction content navigation item can result in different content pages based on the context within which the content of the original page is presented.

Further still, unlike conventional systems in which a user who is not interested in the linked content page cannot further interact with the content page to obtain content pages with additional content, the techniques described in this specification enable the user to continue interacting with the content pages by offering access to additional content in which a user might be interested. For example, and as further described in this specification, when a user interacts with a multi-interaction content navigation item, the user can be presented with a dynamically-generated content page that includes multiple multi-interaction content navigation items and non-content navigation items. If the user decides to explore additional content related to a particular multi-interaction content navigation item, the user can then select that item, which then presents another dynamically-generated content page (which in turn can be linked via one or more multi-interaction content navigation items to additional dynamically-generated content pages and so on). In this manner, a user can remain engaged on the publisher's application/platform as the user continues to pursue different types of content on this platform.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
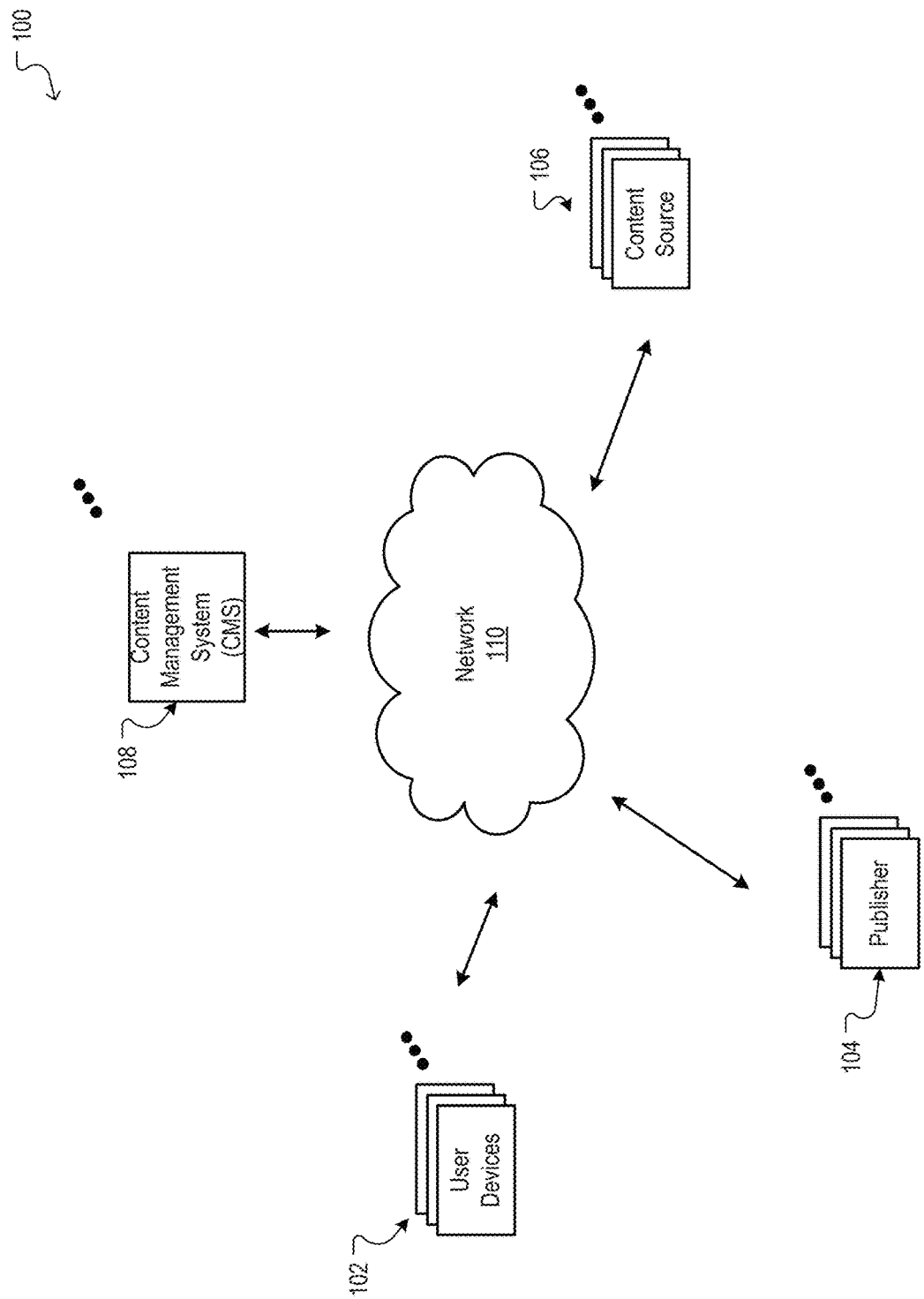
FIG. 1 is a block diagram of an example environment in which content is distributed for presentation

This specification relates to the provision of different content pages based on varying/different user interactions with a single content item on a content page.

As described below and in more detail throughout this specification, a publisher can operate in conjunction with a content management system and one or more content sources to enable access to different content pages based on different user interactions with a multi-interaction content navigation item on a content page (provided by the publisher). A publisher provides a first content page for display within a first application (e.g., the publisher's application) on a user device. The first content page can include multiple content items: multi-interaction content navigation items (as further described in this specification) and non-content navigation items (also further described in this specification).

The multi-interaction content navigation items are configured to enable a user to interact with such content items in different ways. A first set of user interactions with the multi-interaction content navigation item causes display (in the first application or in a different application) of a second content page that (1) is different from the first content page and (2) is linked to by the first content navigation item. A second set of user interactions with the multi-interaction content navigation item (which are different from the first set of user interactions with the multi-interaction content navigation item) causes display of a third content page within the first application. The third content page (1) is different from the first and second content pages and (2) is generated using contextual data representing a context in which content is provided for display on the first content page (and/or one or more other content pages that the user has visited, including pages from which the first content page is linked), which is the within the first application. Each of the first set of user interactions and the second set of user interactions can include a single user interaction or multiple user interactions.

When the publisher and/or a content management system receive from a user device, data indicating a performance of the first set of user interactions with the multi-interaction content navigation item on the first content page, the publisher and/or the content management system provide the second content page for display on the user device (within the first application or in a separate application). On the other hand, when the publisher and/or a content management system receive from a user device, data indicating a performance of the second set of user interactions with the multi-interaction content navigation item, the publisher and/ or the content management system first obtain contextual data representing a context in which content is provided for display on the first content page (and/or one or more other content pages, including content page(s) from which the first content page is linked) within the first application (as further described below). Based on this contextual data, the publisher and/or the content management system identify one or more content items from the one or more content sources and provides these content items for display on a third content page that is presented within the first application. The third content page can include multiple content items, including multi-interaction content navigation items, content navigation items, and non-content navigation items.

As with the first content page, a user of the user device can continue interacting with the content provided for display on the third content page. When the publisher and/or a content management system receive from a user device, data indicating a performance of the first set of user interactions with the multi-interaction content navigation item, the publisher and/or the content management system provide a fourth content page for display on the user device. The fourth content page (1) is different from the first content page and (2) is linked to by the first content navigation item. On the other hand, when the publisher and/or a content management system receive from a user device, data indicating a performance of the second set of user interactions with the multi-interaction content navigation item, the publisher and/ or the content management system first obtain contextual data. Based on this contextual data, the publisher and/or the content management system identify one or more content items from the one or more content sources and provide these content items (e.g., as multi-interaction content navigation items, content navigation items, and/or non-content navigation items) for display on a fifth content page. The fifth content page (1) is different from the third and fourth content pages and (2) is generated using contextual data representing a context in which content is provided for display on the third content page (and/or one or more content page(s) that the user device has visited, including content page(s) from which the third content page is linked) within the first application. In this manner, a user of the user device can continue interacting with the content provided for display on the fifth content page and on each subsequent content page that similarly includes one or more content navigation items.

These features and additional features are described in more detail below with reference to FIGS. 1-4.

Further to the descriptions throughout this document, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity is treated so that no personally identifiable information can be determined for the user, or a user's geographic location may be generalized where location information is obtained (such as to a city, ZIP code, or state level), so that a particular location of a user cannot be determined. Thus, the user has control over what information is collected about the user, how that information is used, and what information is provided to the user.

FIG. 1 is a block diagram of an example environment 100 in which content is distributed for presentation. The example environment 100 includes a network 110, such as a local area network (LAN), a wide area network (WAN), the Internet, or a combination thereof. The network 110 connects user devices 102, content sources 106, publishers 104, and content management systems 108. The example environment 100 may include many different user devices 102, content sources 106, publishers 104, and content management systems 108.

A user device 102 is an electronic device that is capable of requesting and receiving content over the network 110. Example user devices 102 include personal computers, mobile communication devices, digital assistant devices, and other devices that can send and receive data over the network 110. A user device 102 typically includes a user application, such as a web browser, to facilitate the sending and receiving of data over the network 108, but native applications executed by the user device 102 also facilitate the sending and receiving of content over the network 110. As used in this specification, content refers to various types of web-based and/or otherwise presented information, such as articles, discussion threads, reports, analyses, financial statements, music, video, graphics, search results, web page listings, information feeds (e.g., RSS feeds), television broadcasts, radio broadcasts, printed publications, etc.

A publisher 104 is a computing platform that distributes content by providing one or more content pages that can be accessed, e.g., by user devices 102, over the network 110. Example publishers 104 include news applications/websites, content applications/websites, social media platforms, data aggregator platforms, search engine platforms, or other content platforms. Each publisher 104 can be operated by a content publishing service provider.

The publisher 104 publishes, on its content page(s), its own content. For example, the publisher 104 can be a news platform, which publishes news articles that it has authored. The publisher 104 can also publish on its content page(s), third party content provided by a content management system (CMS) 108, which in turn obtains this content from one or more content sources 106. As used in this specification, third party content refers to content provided by a third party—i.e., an entity other than the publisher 104. In some implementations, the publisher 104 can store its own authored content in one or more content sources 106, and can interact with the CMS 108 to obtain such content from the content sources 106.

The CMS 108 is a computing platform that includes one or more backend servers that provides various services to the publishers 104 and/or content sources 106. The CMS 108 stores, manages, and/or provides both content and other types of materials that are stored on a server and retrieved programmatically. The CMS 108 may make these services available to the publishers 104 and content sources 106 through one or more front-end interfaces. In some implementations, the front-end interfaces may be configured as web or native applications that provide these entities/users with access to features provided by the CMS 108.

The CMS 108 selects content (e.g., publisher content and/or third party content) in response to content requests received from user devices 102. In some implementations, when a user of a user device 102 accesses a content page provided by a publisher 104, a script on the content page may execute that requests content from the CMS 108. In some implementations, the user of a user device 102 may request content, e.g., using a search box provided by a search engine on the content page of the publisher 104.

Upon receiving the request for content from the user device 102, the CMS 108 selects content in response to this request. In some implementations, the CMS 108 identifies relevant third party content based on the content on the content page of the publisher 104. For example, the CMS 108 can receive a URL (uniform resource locator) of the content page, e.g., from the user device 102, and identify indexed content keywords associated with the URL. The CMS 108 cross-references the indexed content keywords against a list that specifies/summarizes the content stored in the content sources 106 (e.g., by associating one or more keywords with each content item on the list). As another example, the CMS 108 uses content keywords and/or other content on the content page to identify content stored within one or more content sources 106. The CMS 108 identifies the content by matching the content keywords in the publisher's 104 content page with the keywords associated with the content stored in the list/index maintained by the CMS 108. As yet another example, the content request received from the user device 102 may specifically identify the type of content, e.g., by providing certain keywords, that the CMS 108 cross references against the above-referenced list to identify the appropriate content stored by one or more content sources 106.

Once the CMS 108 identifies the appropriate content items, it requests this content from the appropriate content source 106 where these content items are stored. In response, the appropriate content sources 106 provides one or more content items.

Upon receiving these third party content items from the content source 106, the CMS 108 formats each of these content items using one or more sets of style parameters before providing these content items for display on the user device 102.

As depicted in FIG. 1, a content source 106 is a separate data processing apparatus from the CMS 108, and each may be managed/maintained by different entities. In some implementations, the CMS 108 can include one or more content sources 104, all of which may be managed/maintained by the same entity. In such implementations, when the CMS 108 selects the appropriate content items, it retrieves these content items from its own content source(s) 106 (instead of having to request content from a separate content source 106 over network 110).

In some implementations, the CMS 108 identifies the content and the style parameters that are to be applied to the third party content, and then send a response to the user device 102 that conveys this information to the user device 102. For example, the CMS 108 generates a reply to a content request that includes one or more URLs at which the identified content can be obtained and information identifying the style parameters that are to be applied to each retrieved content item. When the user device 102 receives the reply, the user device 102 can initiate a request to obtain the identified third party content from the one or more URLs, and apply the style parameters to the content blocks as specified by the CMS 108.

Conventionally, a first content page provided for display on the user device includes one or more content navigation items, each of which is linked to another content page that is associated with the content provided within that content navigation item. As such, a user's interaction (e.g., when a user clicks on or selects using other means such as touch) with such a conventional content navigation item typically only causes the other content page linked to by the content navigation item to be displayed on the user device 102.

However, as described with reference to FIGS. 2 and 3, such content navigation items can be modified into multi-interaction content navigation items. As used in this specification, such multi-interaction content navigation items enable different types of interactions with them, in which case, each such interaction is associated with a different action, such as a different content page with different type(s) of content. For example, and as further described with reference to FIGS. 2 and 3, (1) a first set of interactions causes the content page that is linked to by the multi-interaction content navigation item to be displayed on the user device 102 and (2) a second set of interactions with the multi-interaction content navigation item causes a separate (and different) content page to be displayed on the user device 102 that includes multiple content items selected from one or more content sources 106 based on contextual data representing a context in which content is provided for display on the first content page (and/or one or more content page(s) that the user device has visited, including content page(s) from which the first content page is linked).

Figure 2:
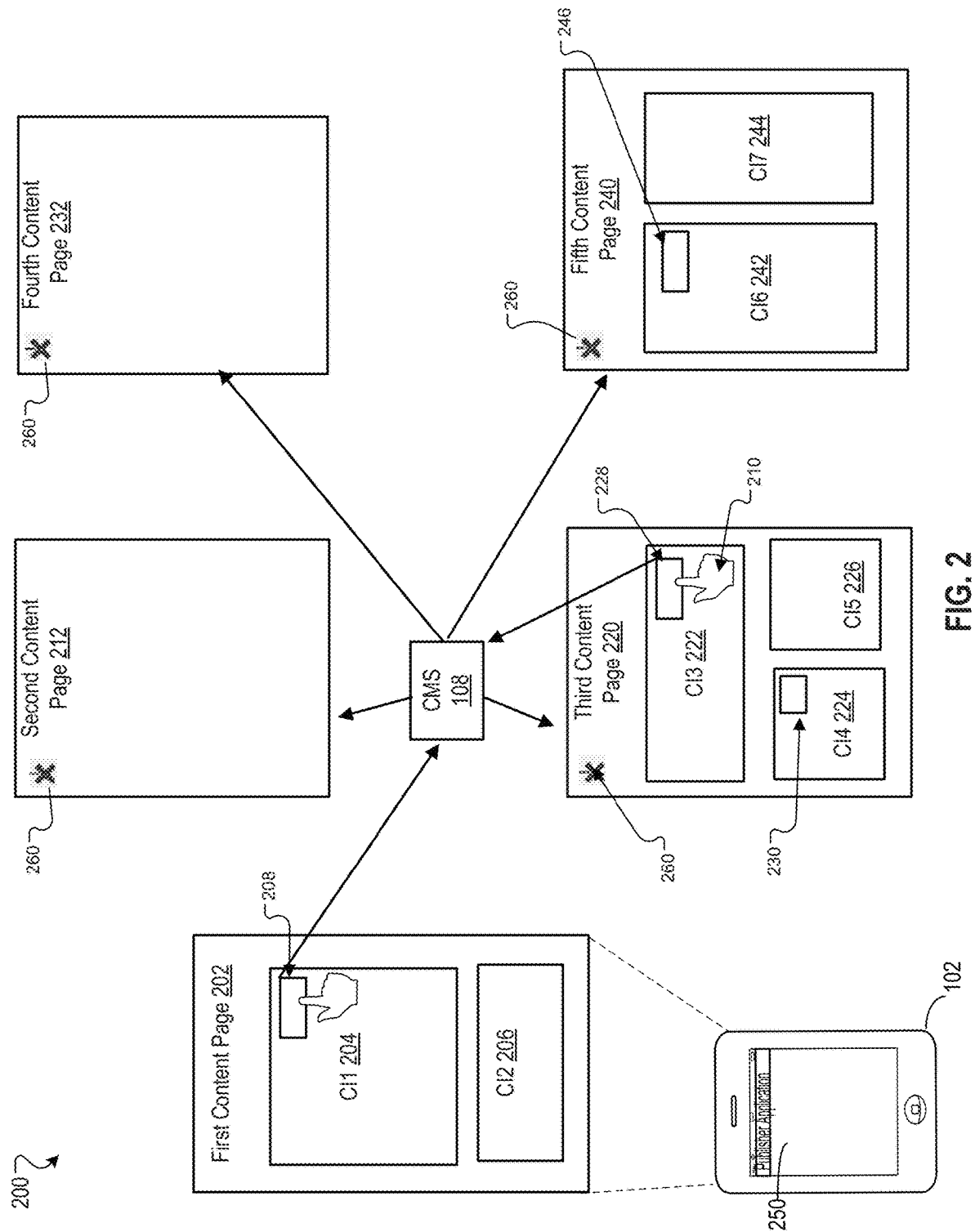
FIG. 2 is a is a block diagram illustrating how a content management system provides different content pages based on different user interactions with multi-interaction content navigation items.

FIG. 2 is a block diagram 200 illustrating how the CMS 108 provides different content pages based on different user interactions with multi-interaction content navigation items.

When a user device 102 accesses a publisher 104's application 250, the publisher 104 provides a content page for display on the user device 102. As shown in FIG. 2, the publisher 104 provides a first content page 202 for display within the publisher 104's application 250 on the user device 102. The first content page 202 includes two content items: CI1 204 and CI2 206. CI1 204 is a multi-interaction content navigation item and CI2 206 is a non-content navigation item.

A user of the user device 102 interacts with the multi-interaction content navigation item, CI1 204, by interacting with a user interface component 208 provided within CI1 204. The user interface component 208 can include one or more of a button, a link, a drop down menu, a drawer menu, or another such interface component with which a user can interact. In some implementations, the user interface component 208 can be a combination of two or more such interactive interface components. For example, the interface component 208 can include a link and button. This may be the case when a user's selection of a link for a certain time period (e.g., three or more seconds) results in a button being displayed that the user can select to navigate to a separate content page.

In some implementations, the user interface component can include one or more discrete components shown within the content navigation item, as is the case with the user interface component 208 explicitly shown within CI1 204. In such implementations, a user can interact with each such component(s) by, e.g., directly selecting or clicking on such component(s). In some implementations, the interface component 208 may not be visible as a discrete component shown within the user selectable content item, but it nevertheless may be interacted with by interacting with any or certain portion(s) of the content navigation item. For example, the entire region (or a portion of the entire region) of the content navigation item can be hyperlinked, such that a user's interaction with (e.g., clicks on or selects) any (or a certain) portion of the user selectable content item constitutes an interaction with the interface component 208.

The multi-interaction content navigation item, and in particular the user interface component 208, is configured to enable and record different types of user interactions with such components. In some implementations, a script executing on the first content page 202 (or instructions within the application 250 or other instructions executing on the user device 102) monitors and distinguishes between different interactions with the user interface component 208 of the multi-interaction content navigation item. For example, the script can monitor the user interactions to distinguish between a button press that lasts less than three seconds and a button press that lasts three seconds or longer. As another example, the script can distinguish between a button press in a particular region of the content navigation item (e.g., the top right portion of the content navigation item) and a user click in another region of the content navigation item. As another example, the script can distinguish between a button press in a particular region of the content navigation item (e.g., the top right portion of the content navigation item) and a click on a link on certain text within the content navigation item. In some implementations, the script can cause additional interface components to be displayed based on a particular user interaction. For example, once the script determines that a mouse over a particular user-selectable content has occurred for n seconds, the script can execute instruction to cause a pop up option to be displayed on the user interface with which the user of the user device 102 can interact.

The data indicating the user's interaction(s) with the interface component 208 within the content navigation item, CI1 204, is provided over the network 110 to the CMS 108.

The CMS 108 uses the received data about the user's interaction(s) with the interface component 208 in determining whether to provide a second content page 212 or a third page 220. In some implementations, the CMS 208 stores a data structure (e.g., a table) that maintains associations between one or more user interactions (e.g., a single click, a mouse over for n seconds followed by a selection of a pop-up) with the interface component 208 of the multi-interaction content navigation item, CI1 204, and the corresponding action to be performed (e.g., which content page to provide for display on the user device 102). Thus, when the CMS receives the data indicating the user interaction(s) with the interface component 208, it looks up the received user interactions for that multi-interaction content navigation item in its data structure and identifies the corresponding action, which indicates the content page to provide for display to the user device 102.

In some implementations, the CMS's data structure may associate a first action with a first set of user interaction(s) and a second action with a second set of user interaction(s) (that is/are different from the first set of user interaction(s)). The first action can be to provide for display another content page that is linked to by the multi-interaction content navigation item. In some implementations, this other content page includes content that is further descriptive, representative of, or otherwise related to the content provided for display within the content navigation item. For example, if the content of the content navigation item is a baby crib by a particular manufacturer, the content of the other content page may be a home page of the website for that baby crib manufacturer. The second action can be to provide for display another dynamically-generated content page that includes multiple content items from one or more content sources 106, in which case, the content items are selected based on the processing of contextual data representing a context in which content is provided for display on the original/first content page (and/or one or more content page(s) that the user device has visited, including content page(s) from which the first content page is linked).

With reference to FIG. 2, the data structure maintained by the CMS 108 can associate (1) the first set of user interaction (s) with the multi-interaction content navigation item, CI1 204, with the provision of the second content page 212 and (2) the second set of user interaction(s) with this multi-interaction content navigation item, with the provision of the third content page 220. Similarly, with reference to the third content page 220, the data structure maintained by the CMS 108 can associate (1) the first set of user interaction(s) with the interface component 228 of the multi-interaction content navigation item, CI3 222, with the provision of the fourth content page 232 and (2) the second set of user interaction(s) with this content item CI3 222, with the provision of the fourth content page 240. The selection and display of the content on the third content page and the fifth content page is described further with reference to FIG. 3.

As another example, with reference to the third content page 220, the data structure maintained by the CMS 108 can associate (1) the first set of user interaction(s) with the interface component 230 of the multi-interaction content navigation item, CI4 224, with the provision of a sixth content page (not shown) and (2) the second set of user interaction(s) with this multi-interaction content item CI4 224, with the provision of a seventh content page (not shown). As another example, with reference to the fifth content page 240, the data structure maintained by the CMS 108 can associate (1) the first set of user interaction(s) with the interface component 246 of the multi-interaction content navigation item, CI6 242, with the provision of an eight content page (not shown) and (2) the second set of user interaction(s) with this multi-interaction content item CI6 242, with the provision of a ninth content page (not shown).

As shown in FIG. 2, content items CI2 206, CI5 226, and CI7 244 are non-content navigation items. In other words, a user's interactions with these content items does not cause a display of another content page. In some implementations, instead of the CMS storing the data structure and determining a particular action (e.g., the content page to display), the user device 102 can store such a data structure and an agent running on the user device 102 (or alternatively the script executing on the content page) can cross-reference the set of user interactions with this data structure to determine the appropriate action. Once this action is determined, the user device 102 (or alternatively, the script or the agent) can negotiate with the CMS 108 and/or the publisher 104 to obtain the additional content pages and/or the multi-interaction content navigation items for such content pages.

As described above, the content pages—second content page 212, third content page 220, fourth content page 232, and fifth content page 240—can be provided for display within the first application (e.g., the publisher 104's application 250) or in a separate application. When these content pages are provided for display within the first application, these content pages are provided as an overlay page that is overlaid or displayed over the first content 202. In such implementations, a user of the user device 102 can request to close the overlay page, e.g., by selecting the exit or "X" button 260 (or by selecting another interface component associated with the action of closing the overlay page), shown on these content pages. Upon selection of such an interface component, the user device 102 closes the overlay page and provides the first content page 202 for display within the application 250.

This is further illustrated using the following example in which a user is on a first content page that includes multiple content items: a non-navigation content item that is an article discussing baby shower gifts and a multi-interaction content navigation that shows an image of a few different baby blankets along with text of the brand name of the baby blanket as well as the text "softest baby blankets." A user of a user device can interact with baby shower gifts content item in two ways: a first way in which the user clicks/selects any portion of this content item and a second way in which the user mouses/hovers over this content for three seconds, which results in a pop-up that reads "Explore More."

If the user simply clicks on the baby blanket content item, he/she is navigated to a landing page for the brand's website for the baby blanket. On the other hand, if the user mouses/hovers over for three second and then clicks the "Explore More" pop-up that appears, he/she is navigated to a different content page, which is dynamically generated using contextual data based on the original content page (and/or one or more content page(s) that the user device has visited, including content page(s) from which the first content page is linked). For example, the CMS 108 may determine based on the contextual data, which includes an article discussing baby shower gifts and the user's selection of baby blankets that the user is interested in baby products. As a result, the CMS 108 obtains content items from one or more content sources 106 that are geared toward baby products and provides these content items for display within the first application. The CMS 108 and the publisher 104 can provide these content items for display as non-content navigation items (e.g., an article about top baby gifts, in which case the article does not link to another content page), content navigation items (e.g., a display banner showing a line of baby strollers, which upon being clicked, links to a content page for the baby stroller manufacturer's website), and multi-interaction content navigation items (e.g., a content item that includes text "Safest baby products" along with images of different products, which can be interacted with in two ways). As described above, a user's separate and different interactions with the multi-interaction content navigation items again results in the presentation of two different types of content pages with different types of content.

Figure 3:
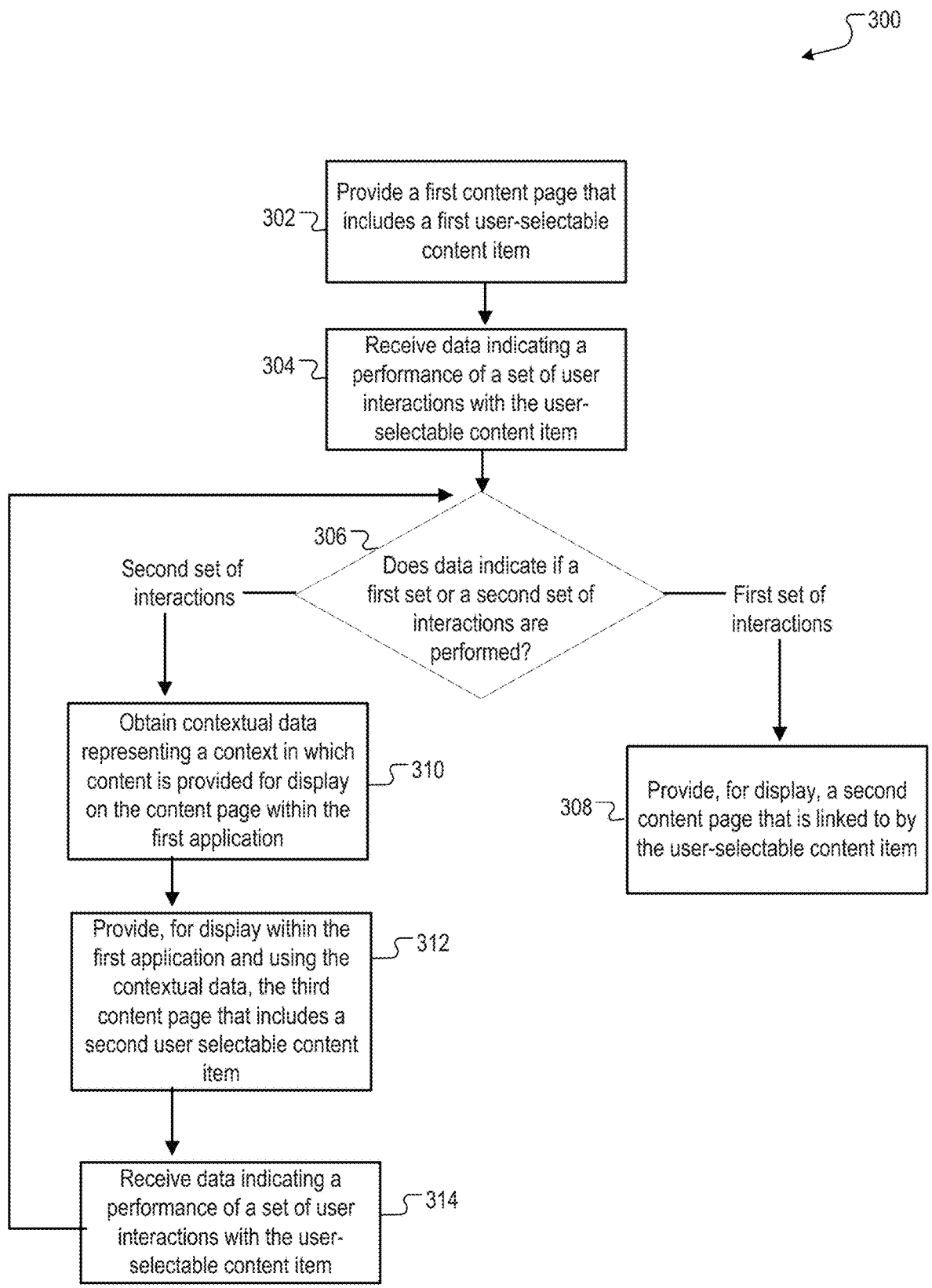
FIG. 3 is a flow diagram of an example process for providing different content pages based on different user interactions with multi-interaction content navigation items.

FIG. 3 is a flow diagram of an example process 300 for providing different content pages based on different user interactions with multi-interaction content navigation items. Operations of process 300 are described below as being performed by the components of the system described and depicted in FIGS. 1 and 2. Operations of the process 300 are described below for illustration purposes only. Operations of the process 300 can be performed by any appropriate device or system, e.g., any appropriate data processing apparatus. Operations of the process 300 can also be implemented as instructions stored on a non-transitory computer readable medium. Execution of the instructions cause one or more data processing apparatus to perform operations of the process 300.

The process 300 provides a first content page that includes a first multi-interaction content navigation item for display within a first application of a user device (at 302). In some implementations, and as described with reference to FIGS. 1 and 2, a publisher 104 provides a first content page 202 for display within the publisher 104's application 250 on the user device 102. The first content page 202 can include one or more content items (e.g., publisher authored content items or third party content items) that are either provided by the publisher 104 or obtained by a CMS 108 from one or more content source(s) 106. One or more of such content items can be a first multi-interaction content navigation item (e.g., CI1 204), a content navigation item, or a non-content navigation item.

As described with reference to FIG. 2, the CMS 108 can store a data structure that maintains associations between different user interaction(s) with the multi-interaction content navigation item and the corresponding action, i.e., the content page to be displayed. For example, the CMS 108's data structure can maintain an association between a first set of user interaction(s) with the multi-interaction content navigation item 204 (including interactions with the user interface component 208) and the provision of a second content page 212 (in the first application 250 or in a different application). In this example, the second content page (1) is different from the first content page 202 and (2) is linked to by the first multi-interaction content navigation item, CI1 204. As another example, the CMS 108 can maintain an association between a second set of user interactions (which are different from the first set of user interactions) with the first multi-interaction content navigation item, CI1 204, and the provision of a third content page 220 within the first application 250 (or alternatively, in a different application that is not shown in FIG. 2). In this example, the third content page 220 (1) is different from the first content page 202 and the second content page 212 and (2) is generated using contextual data representing a context in which content is provided for display on the first content page 202 (and/or one or more content page(s) that the user device has visited, including content page(s) from which the first content page is linked) within the first application 250 (as further described with reference to operation 310).

The process 300 receives from the user device 102, data indicating a performance of set of user interactions with the first multi-interaction content navigation item (at 304). In some implementations, and as described with reference to FIG. 2, a user of the user device 102 interacts with the interface component 208 of the first multi-interaction content navigation item, CI1 204. As a result, the user device 102 transmits data indicating the set of user interactions to the CMS 108.

The process 300 determines whether the data indicates if a first set or a second set of interactions are performed at step 304 (at 306). In some implementations, the CMS 108 parses the received data indicating the set of user interactions to determine if this data indicates a first or second set of user interactions. For the particular multi-interaction content navigation item, the CMS 108 determines this by comparing (e.g., by trying to find a match between) the received data indicating the set of user interactions with the data for the different sets (i.e., the first set and the second set) of user interactions stored in the data structure maintained by the CMS 108.

If the CMS 108 determines that the received data indicates that a first set of user interactions was performed with the first multi-interaction content navigation item, the process 300 provides, for display on the user device, a second content page that is linked to by the first user selectable content item (at 308). In some implementations, the publisher 104 provides the second content page 212 that includes its own content or content obtained by the CMS 108 from one or more content sources 106. The second content page 212 is linked to by the first content page and includes content that is further descriptive, representative of, or otherwise related to the content provided for display within the content navigation item (e.g., CI1 204).

On the other hand, if the CMS 108 determines that the received data indicates that a second set of user interactions was performed with the first content navigation item, the process 300 obtains contextual data representing a context in which content is provided for display on the content page (and/or one or more content page(s) that the user device has visited, including content page(s) from which the content page is linked) within the first application (at 310). As used in this specification, contextual data, or the context in which content is presented for display on a content page, is defined using a variety of attributes including one or more of: a type of device that is presenting the content, the content block within which the content will be presented, a time of day at which the content is being presented, a geographic location of the device that is presenting the content, content on the content page (including content within the content navigation item), attributes of a user device to which the content is being presented (including the user device's content viewing preferences), content of one or more content page(s) that the user device has visited and from which the content page is linked, a type of browser/application that is being used to present the content, or other appropriate attributes.

The contextual data can be obtained using one or more of the following techniques. In some implementations, when a user device 102 accesses a content page, a script on the content page collects such contextual data in the form of attributes, such as the user agent or application (e.g., browser, native application), the screen size, third party content containers or blocks (e.g., portions of the page that have been identified in the page's structure for presenting the third party content), the type of device (e.g., mobile or desktop), and geolocation information (e.g., IP address, language settings, etc.).

Alternatively, or additionally, the user device 102 can also collect contextual data in the form of the content provided for display within the first content navigation item or content provided for display in other portions (i.e., portions other than the portion making up the content navigation item) of the first content page 202. In some implementations the user device 102 can have an agent that parses the content items of the content page on the content page to determine the topic(s)/categor(ies) of content relevant to the first content navigation item or the first content page 202 as a whole. The agent can also analyze the markup present on the page (e.g., to identify titles and section headings), the publisher 104's own identification of the category/topic of the content, and/or the actual content on the content page as well as within the content navigation item on the content page. In some implementations, the agent can utilize a learning model (e.g., a supervised machine learning model or another appropriate statistical model) that (1) is trained using known content categories for certain content pages and the corresponding features of such content pages with such features and the corresponding categories and (2) outputs content categor(ies) for a particular content page. In some implementations, the agent can obtain similar information from one or more other content pages that the user has visited, including content pages from which the first content page is linked.

Alternatively, or additionally, the publisher 104 can provide, to the user device 102, contextual data in the form of content preferences (e.g., content format preferences (such as audio, video, text, etc.), content type preferences (such as articles, advertisements, blogs, etc.), content genre preferences (such as sports, news, etc.)) associated with the user of the user device 102. In some implementations, the content preferences can be associated with a profile of the user. In other implementations, the publisher 104 can specifically request such content preferences from the user, e.g., in the form of one or more menus that are presented to the user upon receiving a second set of user interactions. In some implementations, the user device 102 provides the obtained contextual data to the CMS 108.

The process 300 provides, for display within the first application and using the contextual data, the third content page that includes a second user selectable content item (at 312). The CMS 108 uses the obtained contextual data to identify one or more content items from one or more content sources 106. The identified content items can be provided by the same content creator/owner or by different content creators/owners. The identified content items can include content navigation items (including multi-interaction content navigation items) and/or non-content navigation items.

In some implementations, the CMS 108 uses the obtained contextual data in querying one or more content sources 106 for content. For example, the query to the one or more content sources 106 can include parameters from the contextual data, such as the content format (e.g., video, text), the content type (e.g., articles, ads), the content genre, the device location, content keywords extracted from the first content page, and the device type. The CMS 108 can issue such a query to one or more content sources 106, which in turn match the identified query parameters to the parameters associated with one or more content items stored in these content sources 106. The identified content items may be sorted based on their relevance to the query, e.g., by providing a higher rank to content items whose parameters match more query parameters while providing a lower rank to content items whose parameters match fewer query parameters. The CMS 108 may identify all the identified content items or a subset of the identified content items (e.g., only the top N identified content items). The CMS 108 obtains the identified content items from the one or more content sources and then provides these content items (e.g., CI3 222, CI4 224, and CI5 226) for display on a third content page (e.g., third content page 220), which is displayed within the first application (i.e., the publisher's application 250 within which the first content page is displayed).

In some implementations, the content items on the third content page 220 can be obtained from multiple content sources 106. In some implementations, the content items on the third content page 220 obtained from or more content sources 106 can be authored or created by a single content creator or multiple content creators. In some implementations, the content items on the third content page 220 obtained from or more content sources 106 can be provided by a single publisher 104 or by multiple publishers 104.

In some implementations, the content items on the third content page 220 obtained from or more content sources 106 (which can include multi-interaction content navigation items (e.g., CI3 22 and CI4 224) and non-content navigation items (CI5 226)) can include image content, textual content, video content, or some combination of image content, textual content, and video content. The type of content (e.g., image, video, text) provided for display on the third content page 220 can be based on preferences of the user of the user device 102. For example, if a user prefers to consume video and text content, the CMS 108 can request, and the one or more content sources 106 can provide, content items that include a combination of video content and text content. As another example, if the user only prefers text content, the CMS 108 can request, and the one or more content sources 106 can provide, content items that include only text content.

The process 300 receives data indicating a performance of a set of user interactions with a second content navigation item (at 314). In some implementations, and as described with reference to FIG. 2, a user of the user device 102 interacts with the second multi-interaction content navigation item (e.g., CI3 222). As a result, the user device 102 transmits data indicating the set of user interactions to the CMS 108.

The process 300 then determines whether to provide the fourth content page 232 or the fifth content page 240 by repeating steps 306-312 with respect to the third content page and the second multi-interaction content navigation item.

Figure 4:
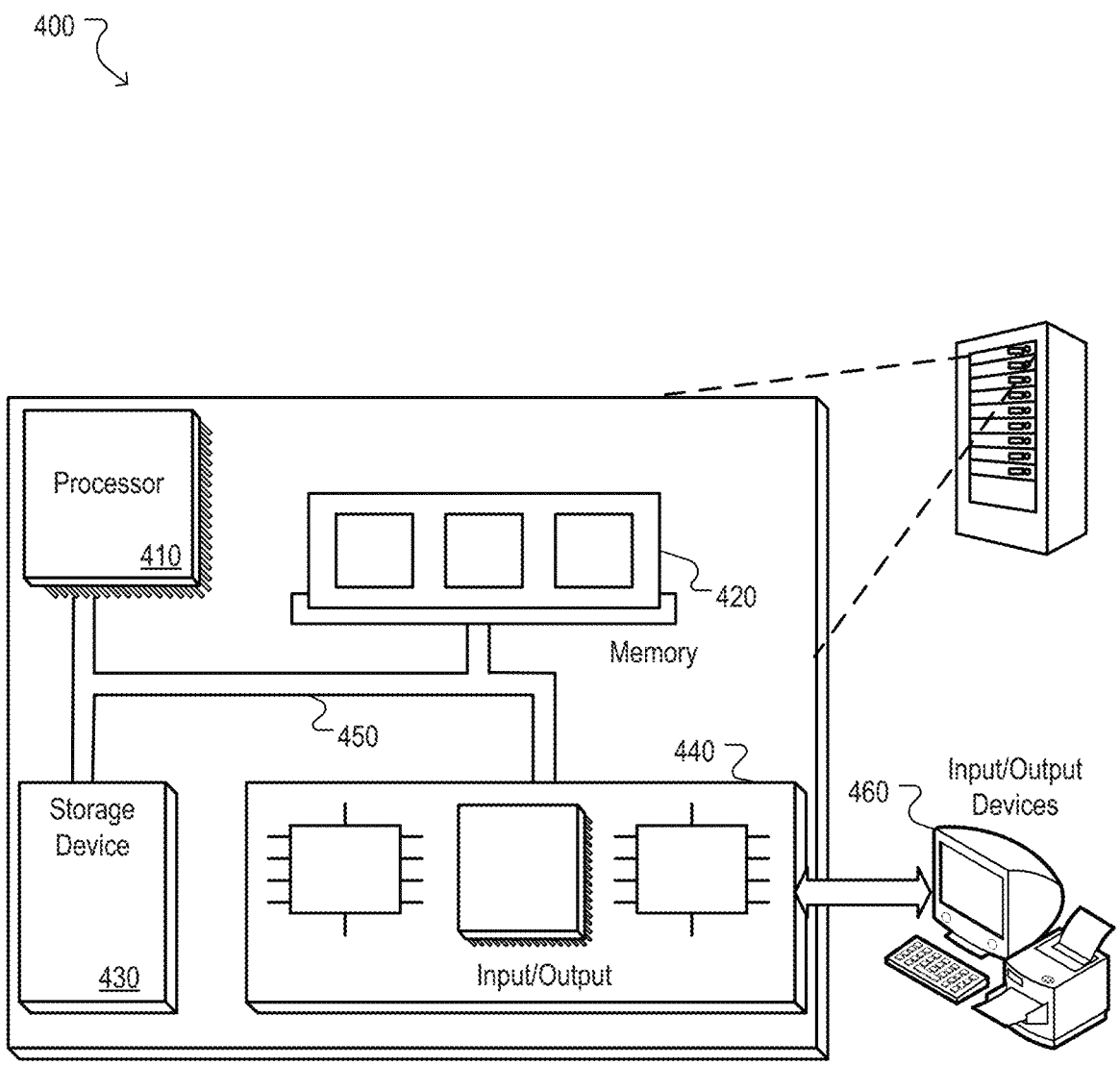
FIG. 4 is a block diagram of an example computer system.

FIG. 4 is block diagram of an example computer system 400 that can be used to perform operations described above. The system 400 includes a processor 410, a memory 420, a storage device 430, and an input/output device 440. Each of the components 410, 420, 430, and 440 can be interconnected, for example, using a system bus 450. The processor 410 is capable of processing instructions for execution within the system 400. In some implementations, the processor 410 is a single-threaded processor. In another implementation, the processor 410 is a multi-threaded processor. The processor 410 is capable of processing instructions stored in the memory 420 or on the storage device 430.

The memory 420 stores information within the system 400. In one implementation, the memory 420 is a computer-readable medium. In some implementations, the memory 420 is a volatile memory unit. In another implementation, the memory 420 is a non-volatile memory unit.

The storage device 430 is capable of providing mass storage for the system 400. In some implementations, the storage device 430 is a computer-readable medium. In various different implementations, the storage device 430 can include, for example, a hard disk device, an optical disk device, a storage device that is shared over a network by multiple computing devices (e.g., a cloud storage device), or some other large capacity storage device.

The input/output device 440 provides input/output operations for the system 400. In some implementations, the input/output device 440 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 460. Other implementations, however, can also be used, such as mobile computing devices, mobile communication devices, set-top box television client devices, etc.

Although an example processing system has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component. e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer implemented method, comprising:
providing, for display within a first application on a user device, a first content page that includes a first multi-interaction content navigation item, wherein the first multi-interaction content navigation item is a content item that can be interacted with using at least two different types of user interactions, each user interaction causing display of a different content page:
a first set of user interactions with the first multi-interaction content navigation item causes display of a second content page that (1) is different from the first content page and (2) is linked to by the first multi-interaction content navigation item, wherein each of the first set of user interactions is of a first type of user interaction; and
a second set of user interactions with the first multi-interaction content navigation item causes display of a third content page within the first application, wherein the second set of user interactions is different from the first set of user interactions and the third content page is different from the first and second content pages, wherein each of the second set of user interactions is of a second type of user interaction different than the first type of user interaction;
receiving, from the user device, data indicating a performance of the second set of user interactions with the first multi-interaction content navigation item;
in response to receiving the data indicating the performance of the second set of user interactions:
identifying, from among a plurality of content sources, a set of content items for the third content page; and
providing, for display within the first application, the third content page that includes a second multi-interaction content navigation item different from the first multi-interaction content navigation item, wherein:
a first set of user interactions with the second multi-interaction content navigation item causes display of a fourth content page that (1) is different from the third content page and (2) is linked to by the second multi-interaction content navigation item; and
a second set of user interactions with the second multi-interaction content navigation item causes display of a fifth content page within the first application, wherein the fifth content page (1) is different from the third and fourth content pages and (2) is generated using contextual data including content of the second multi-interaction content navigation item and additional context representing a context in which content is provided for display on the third content page within the first application,
wherein each of the second, third, fourth, and fifth content pages are provided as an overlay page within the first application, wherein the overlay page is displayed over the first content page.

2. The computer implemented method of claim 1, wherein a request from the user device to close the overlay page causes the overlay page to be closed and the first content page to be presented for display.

3. The computer implemented method of claim 1, wherein content items for the fifth content page is selected from a plurality of content sources.

4. The computer implemented method of claim 1, wherein content items for each of the third content page and the fifth content page is provided by a plurality of publishers.

5. The computer implemented method of claim 1, wherein each of the third content page and the fifth content page comprises one or more additional content items and wherein the second multi-interaction content navigation item and the one or more additional content items comprise a combination of image content, textual content, and video content.

6. The computer implemented method of claim 1, wherein the third content page is generated based on contextual data comprising (1) content provided for display in the first multi-interaction content navigation item, (2) other content provided for display on the first content page, or (3) content provided on other pages that the user has visited and from which the first content page is linked.

7. The computer implemented method of claim 6, wherein the contextual data comprises content preferences associated with the user device.

8. The computer implemented method of claim 1, wherein the contextual data representing a context in which content is provided for display on the third content page within the first application comprises (1) content provided for display in the second multi-interaction content navigation item, (2) other content provided for display on the third content page, or (3) content provided on other pages that the user has visited and from which the third content page is linked.

9. The computer implemented method of claim 1, wherein the third content page is generated based on contextual data representing a context in which content is provided for display on the first content page within the first application.

10. The computer implemented method of claim 9, wherein the contextual data comprises content parameters relating to at least one of (i) type, (ii) format, (iii) keywords, or (iv) genre, of content items from the plurality of content sources.

11. The computer implemented method of claim 9, wherein the contextual data comprises style parameters that configure a context in which the set of content items is presented for display on a device, wherein the contextual data comprises at least one of (i) location, or (ii) type, of the device configured to display the set of content items from the plurality of content sources according to the style parameters.

12. The computer implemented method of claim 1, wherein the first type of user interaction is an interaction with the first multi-interaction content navigation item spanning a duration that satisfies a particular time threshold, and wherein the second type of user interaction is an interaction with the first multi-interaction content navigation item spanning a duration that does not satisfy the particular time threshold.

13. A system, comprising:
one or more memory devices storing instructions; and
one or more data processing apparatus that are configured to interact with the one or more memory devices, and upon execution of the instructions, perform operations including:
providing, for display within a first application on a user device, a first content page that includes a first multi-interaction content navigation item, wherein the first multi-interaction content navigation item is a content item that can be interacted with using at least two different types of user interactions, each user interaction causing display of a different content page:
  a first set of user interactions with the first multi-interaction content navigation item causes display of a second content page that (1) is different from the first content page and (2) is linked to by the first multi-interaction content navigation item, wherein each of the first set of user interactions is of a first type of user interaction; and
  a second set of user interactions with the first multi-interaction content navigation item causes display of a third content page within the first application, wherein the second set of user interactions is different from the first set of user interactions and the third content page is different from the first and second content pages, wherein each of the second set of user interactions is of a second type of user interaction different than the first type of user interaction;
receiving, from the user device, data indicating a performance of the second set of user interactions with the first multi-interaction content navigation item;
in response to receiving the data indicating the performance of the second set of user interactions:
  identifying, from among a plurality of content sources, a set of content items for the third content page; and
  providing, for display within the first application, the third content page that includes a second multi-interaction content navigation item different from the first multi-interaction content navigation item, wherein:
    a first set of user interactions with the second multi-interaction content navigation item causes display of a fourth content page that (1) is different from the third content page and (2) is linked to by the second multi-interaction content navigation item; and
    a second set of user interactions with the second multi-interaction content navigation item causes display of a fifth content page within the first application, wherein the fifth content page (1) is different from the third and fourth content pages and (2) is generated using contextual data including content of the second multi-interaction content navigation item and additional context representing a context in which content is provided for display on the third content page within the first application,
wherein each of the second, third, fourth, and fifth content pages are provided as an overlay page within the first application, wherein the overlay page is displayed over the first content page.

14. The system of claim 13, wherein a request from the user device to close the overlay page causes the overlay page to be closed and the first content page to be presented for display.

15. The system of claim 13, wherein content items for the fifth content page is selected from a plurality of content sources and wherein content items for each of the third content page and the fifth content page is provided by a plurality of publishers.

16. The system of claim 13, wherein each of the third content page and the fifth content page comprises one or more additional content items and wherein the second multi-interaction content navigation item and the one or more additional content items comprise a combination of image content, textual content, and video content.

17. The system of claim 13, wherein the third content page is generated based on contextual data comprising (1) content provided for display in the first multi-interaction content navigation item, (2) other content provided for display on the first content page, or (3) content provided on other pages that the user has visited and from which the first content page is linked.

18. The system of claim 17, wherein the contextual data representing a context in which content is provided for display on the third content page within the first application comprises (1) content provided for display in the second multi-interaction content navigation item, (2) other content provided for display on the third content page, or (3) content provided on other pages that the user has visited and from which the third content page is linked.

19. The system of claim 17, wherein the contextual data comprises content preferences associated with the user device.

20. A non-transitory computer readable medium storing instructions that, when executed by one or more data processing apparatus, cause the one or more data processing apparatus to perform operations comprising:
providing, for display within a first application on a user device, a first content page that includes a first multi-interaction content navigation item, wherein the first multi-interaction content navigation item is a content item that can be interacted with using at least two different types of user interactions, each user interaction causing display of a different content page:
  a first set of user interactions with the first multi-interaction content navigation item causes display of a second content page that (1) is different from the first content page and (2) is linked to by the first multi-interaction content navigation item, wherein each of the first set of user interactions is of a first type of user interaction; and
  a second set of user interactions with the first multi-interaction content navigation item causes display of a third content page within the first application, wherein the second set of user interactions is different from the first set of user interactions and the third content page is different from the first and second content pages, wherein each of the second set of user interactions is of a second type of user interaction different than the first type of user interaction;

receiving, from the user device, data indicating a performance of the second set of user interactions with the first multi-interaction content navigation item;

in response to receiving the data indicating the performance of the second set of user interactions:

identifying, from among a plurality of content sources, a set of content items for the third content page; and providing, for display within the first application, the third content page that includes a second multi-interaction content navigation item different from the first multi-interaction content navigation item, wherein:

a first set of user interactions with the second multi-interaction content navigation item causes display of a fourth content page that (1) is different from the third content page and (2) is linked to by the second multi-interaction content navigation item; and a second set of user interactions with the second multi-interaction content navigation item causes display of a fifth content page within the first application, wherein the fifth content page (1) is different from the third and fourth content pages and (2) is generated using contextual data including content of the second multi-interaction content navigation item and additional context representing a context in which content is provided for display on the third content page within the first application, wherein each of the second, third, fourth, and fifth content pages are provided as an overlay page within the first application, wherein the overlay page is displayed over the first content page.

* * * * *